United States Patent [19]
Skopic

[11] Patent Number: 5,594,213
[45] Date of Patent: Jan. 14, 1997

[54] WIRE SPLICE

[75] Inventor: Albert D. Skopic, York, Pa.

[73] Assignee: Osram Sylvania Inc., Danvers, Mass.

[21] Appl. No.: 491,798

[22] Filed: Jun. 19, 1995

[51] Int. Cl.$^6$ .................................................. H02G 15/113
[52] U.S. Cl. .................................. 174/91; 174/92; 174/93
[58] Field of Search ................................. 174/91, 92, 93, 174/84 R, 87

[56] References Cited

U.S. PATENT DOCUMENTS

| | | | |
|---|---|---|---|
| 2,937,228 | 5/1960 | Robinson | 174/88 R X |
| 3,173,989 | 3/1965 | Neaderland | 174/84 |
| 3,183,302 | 5/1965 | Wochner et al. | 174/138 R X |
| 4,935,582 | 6/1990 | Calligaris | 174/92 |
| 5,266,743 | 11/1993 | Helbawi | 174/93 |

Primary Examiner—Kristine L. Kincaid
Assistant Examiner—Chau N. Nguyen
Attorney, Agent, or Firm—William H. McNeill

[57] ABSTRACT

A splice is provided which includes two semi-cylindrical splice members joined together for relative pivotal movement into and out of engagement with each other in a closed mode and an open mode, respectively. Each splice member incudes two channels. Respective two channels of each splice member are aligned with each other in the closed mode to form a first cavity and a second cavity. The walls of the first cavity bear against a first length of wire, and the walls of the second cavity bear against a second length of wire which is mechanically and electrically coupled to the first length of wire within the first cavity.

17 Claims, 4 Drawing Sheets

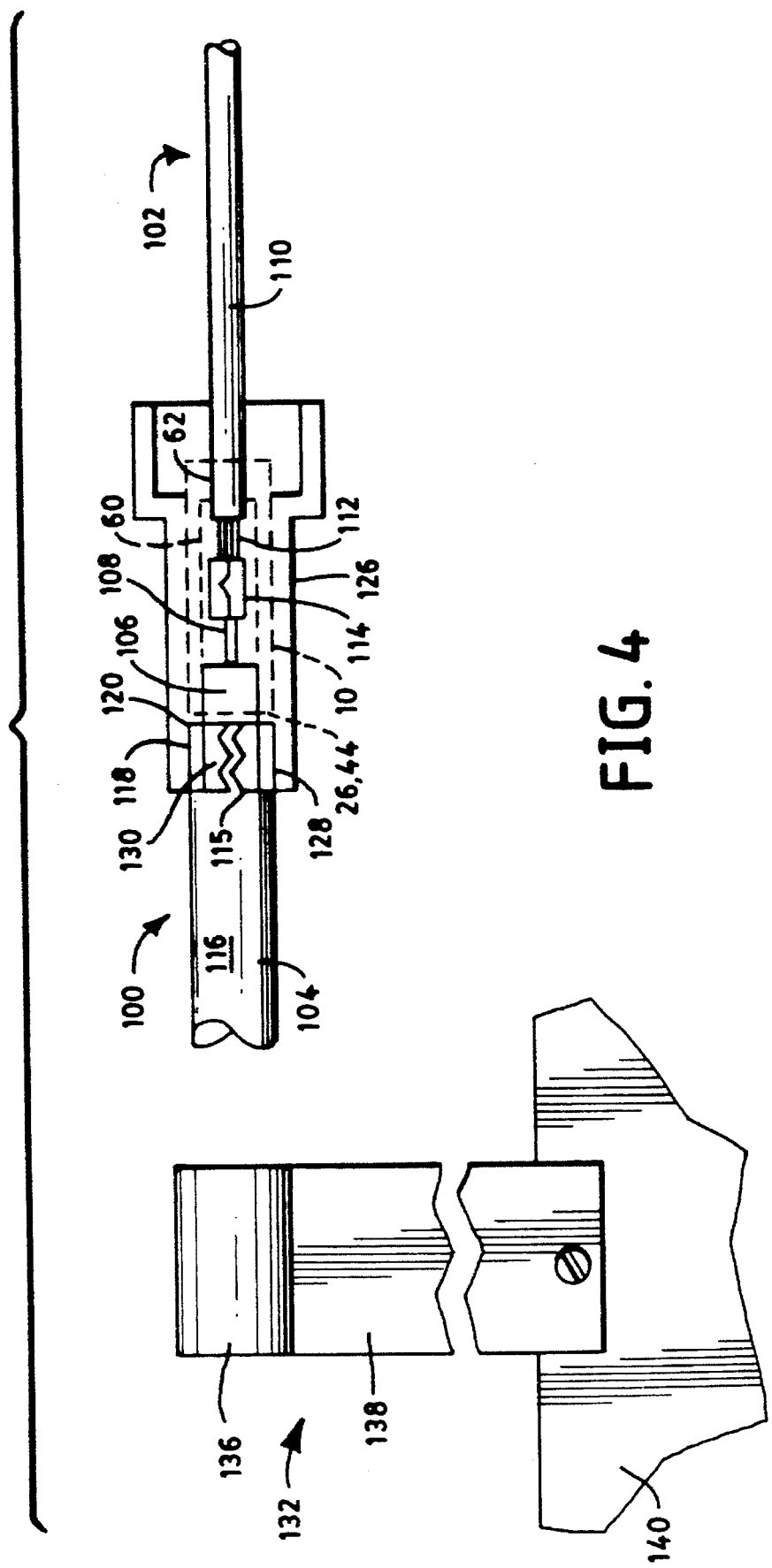

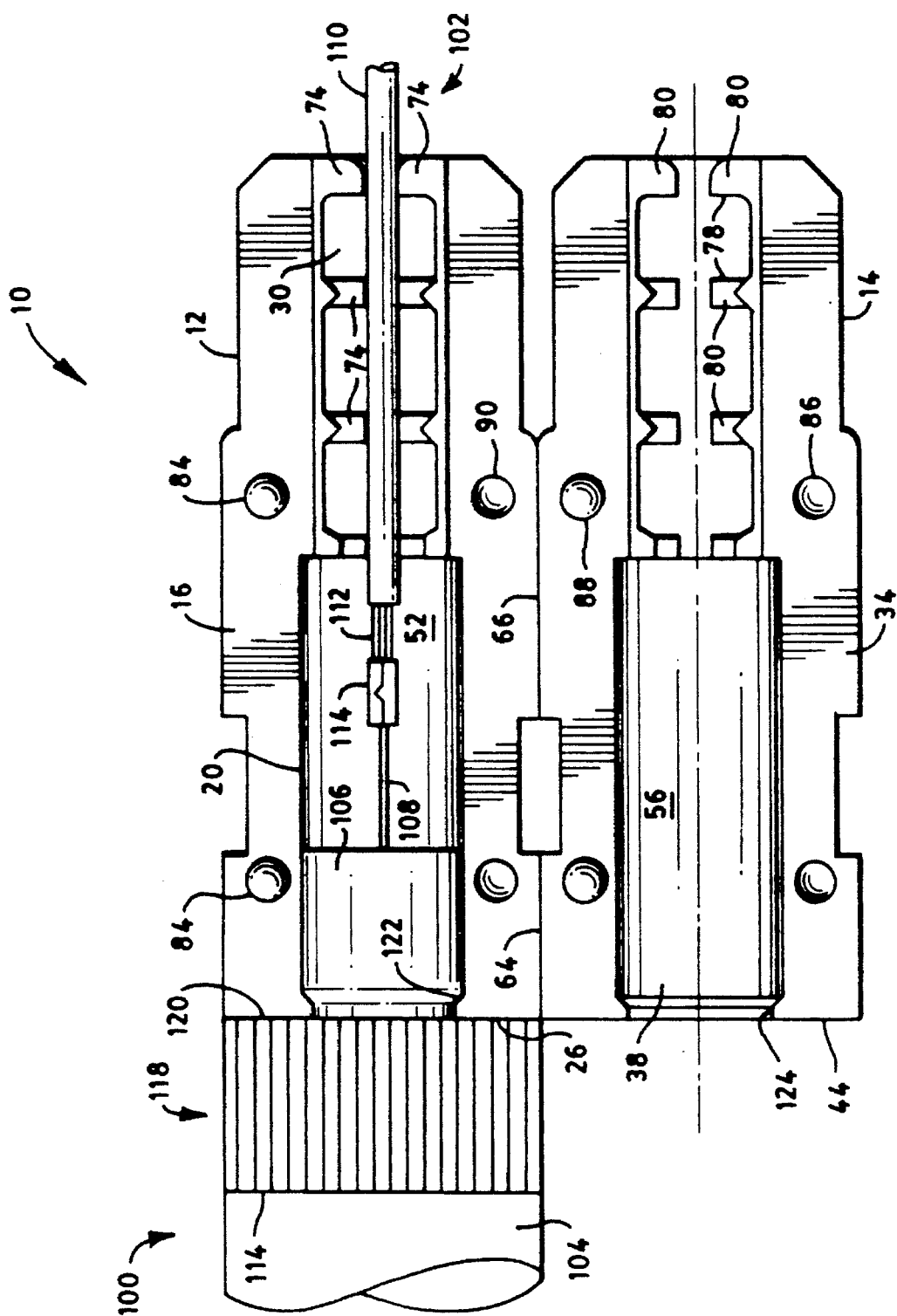

WIRE SPLICE

BACKGROUND OF THE INVENTION

1. Field of the Invention

The present invention relates to a wire splice, and to a connector which includes such a wire splice, which provides strain relief to prevent slippage of a wire, contained by such wire splice, when the wire is subjected to an axial pull. The wire splice of the present invention is particularly useful in preventing slippage of a multifilament wire relative to a monofilament wire of a coaxial cable electrically and mechanically connected together for use with an automobile antenna.

2. Description of the Prior Art

It is known in the art to mechanically and electrically join together a monofilament wire of a coaxial cable and a multifilament wire having an end connected to an insulated terminal housing. By way of example, such connections are typically used with automobile antennas. It is also known to use a wire splice with such connections to provide strain relief when the wires are subjected to axial pull relative to each other. A problem incurred if the wire splice is not satisfactory is that there is a tendency for the connection to become disconnected due to slippage, particularly slippage of the multifilament wire relative to the wire splice and monofilament wire. This problem is aggravated when the wire splice is mounted in place upon a support surface. In such instances, if adequate strain relief is not provided by the wire splice, there will be a tendency for the connection between wires to break when the multifilament wire is subjected to an axial pull. The reason for this is that the mounted wire splice and monofilament wire will resist movement due to the mounting thereof.

It is an object of the present invention to provide an improved wire splice for use with wires, which are mechanically and electrically connected together, which will prevent substantial wire slippage when one or both of the wires is subjected to an axial pull.

It is another object of the present invention to provide an improved splice, for use with a monofilament wire of a coaxial cable mechanically and electrically connected to a multifilament wire, which will prevent substantial wire slippage when one or both of the wires is subjected to axial pull.

It is yet another object of the present invention to provide a connector which includes such a splice.

It is a further object of the present invention to provide such a connector including a mounting clamp for attaching the wire splice to a support surface.

DISCLOSURE OF THE INVENTION

These objects are achieved, in one aspect of the invention by the provision of a wire splice which is provided with a first splice member and a second splice member. Each splice member comprises a first surface, an opposite second surface, and a first and second channel extending into the first surface towards the opposite second surface. The first channel extends in the direction of a horizontal axis of a respective splice member from a first end of the first surface towards an opposite second end of the first surface. The second channel extends in the direction of a horizontal axis of a respective splice member from the opposite second end of the first surface towards the first end of the first surface. The second channel opens into the first channel. The first splice member is pivotally connected to the second splice member along a pivot axis. A first channel and a second channel of the first splice member are radially in alignment relative to the pivot axis with a first channel and a second channel, respectively, of the second splice member. The first splice member and the second splice member are pivotal into and out of engagement with each other in a closed mode and an open mode, respectively.

BRIEF DESCRIPTION OF THE DRAWINGS

This invention may be clearly understood by reference to the attached drawings in which:

FIG. 4 is a view of a connector which comprises a wire splice of the type depicted in FIGS. 1–3; and FIG. 5 is a plan view of the wire splice of FIGS. 1–4 during assembly.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
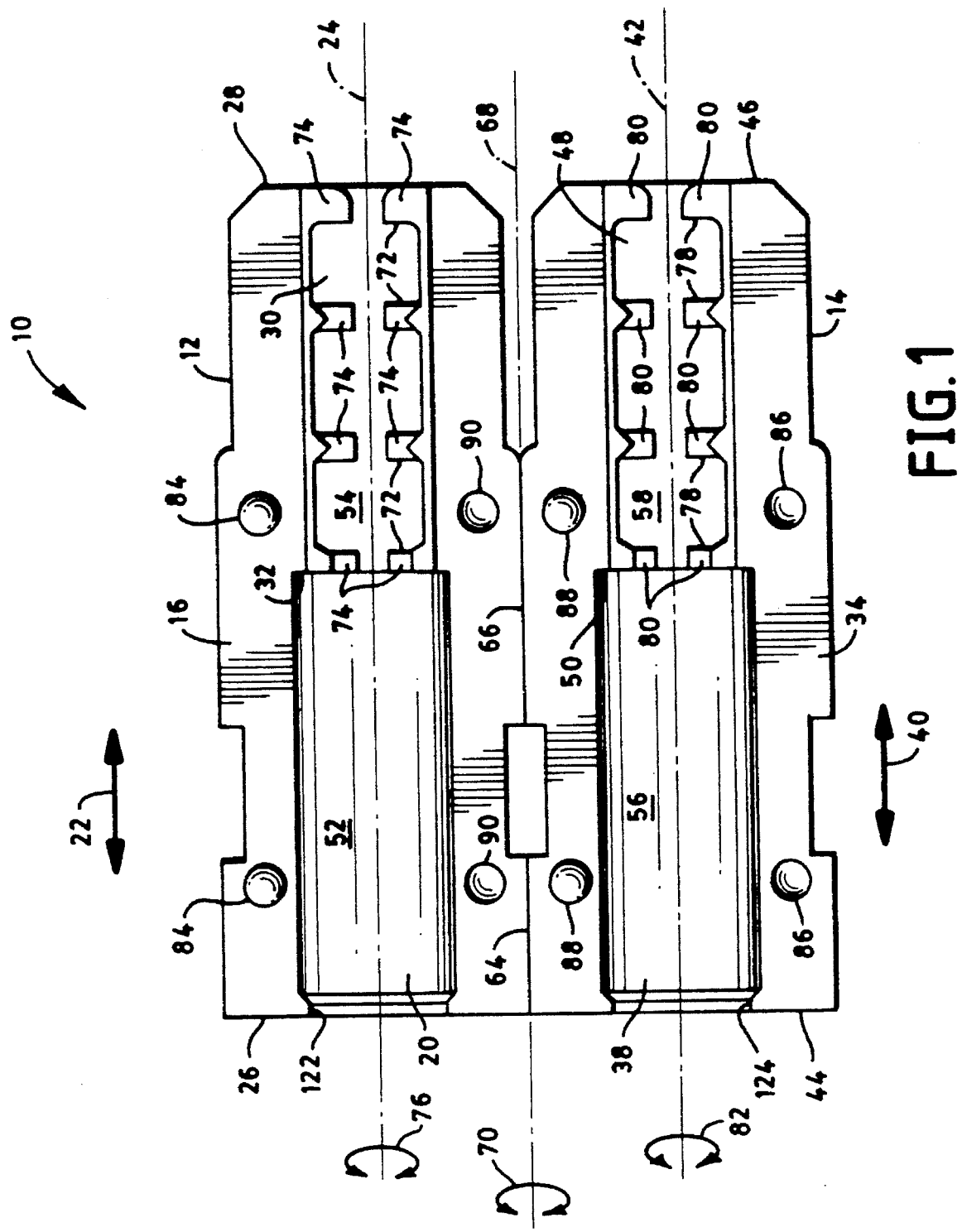
FIG. 1 is a plan view of a wire splice embodying the present invention.
Figure 2:
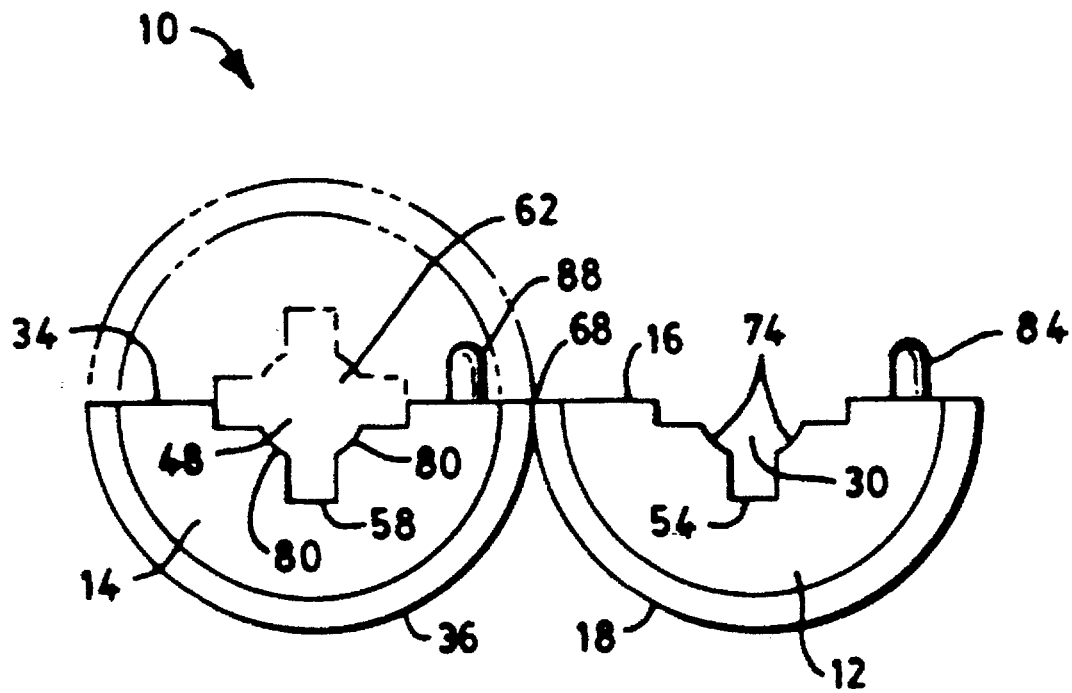
FIG. 2 is an end view of the embodiment of FIG. 1 taken from the fight hand side of the FIG. 1 drawing.
Figure 3:
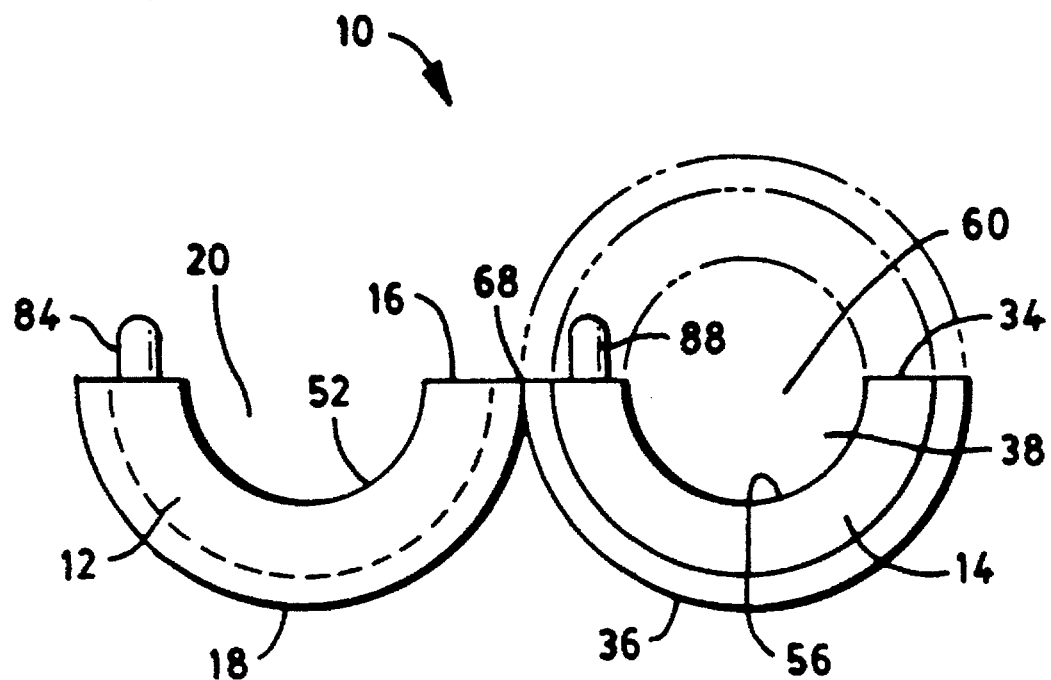
FIG. 3 is an end view of the embodiment of FIG. 1 taken from the left hand side of the FIG. 1 drawing.

The embodiment of this invention which is illustrated in FIGS. 1 to 3 is particularly suited for achieving the objects of this invention. FIGS. 1 to 3 depicts a splice 10 which comprises a first splice member 12 and a second splice member 14. Splice 10 is made of an insulative material such as plastic. Although not necessary, in the embodiment of FIGS. 1 to 3 splice members 12 and 14 are identical. Splice member 12 comprises a surface 16 and an opposite surface 18. A channel 20 extends into the surface 16 towards the opposite surface 18. Channel 20 extends in the direction 22 of a horizontal axis 24 of the splice member 12 from an end 26 towards an opposite end 28 of the surface 16. A second channel 30 extends into the surface 16 towards the opposite surface 18. Channel 30 extends in the direction 22 of horizontal axis 24 from the end 28 towards the end 26 of the surface 16. The channel 30 opens into the channel 20 at surface 32.

Like splice member 12, splice member 14 comprises a surface 34 and an opposite surface 36. A channel 38 extends into the surface 34 towards the opposite surface 36. Channel 38 extends in the direction 40 of a horizontal axis 42 of the splice member 14 from an end 44 towards an opposite end 46 of the surface 34. A second channel 48 extends into the surface 34 towards the opposite surface 36. Channel 48 extends in the direction 40 of horizontal axis 42 from the end 46 towards the end 44 of the surface 34. The channel 48 opens into the channel 38 at surface 50.

In the embodiment of FIGS. 1 to 3 the splice 10 is generally tubular, each splice member 12 and 14 being generally semi-cylindrical in shape. The walls 52 and 54 of channels 20 and 30, respectively, and the walls 56 and 58 of channels 38 and 48, respectively, are semi-cylindrical.

The first splice member 12 is coupled to the second splice member 14 in a closed mode, as depicted in phantom lines in FIGS. 2 and 3. In such closed mode surface 16 of splice member 12 abuts surface 34 of splice member 14 and channels 20 and 30 of splice member 12 are in alignment with channel 38 and 48, respectively, of splice member 14. In such closed mode, channels 20 and 38 form a channel cavity 60 and channels 30 and 48 form a channel cavity 62. The splice member 12 may be uncoupled from the second splice member 14 in an open mode, as depicted in solid lines in FIGS. 2 and 3.

In the preferred embodiment, splice member 12 is pivotally connected to splice member 14. For example, in the embodiment of FIGS. 1 to 3, splice member 12 is pivotally connected to splice member 14 by means of webs 64 and 66 formed integrally with splice members 12 and 14. Webs 64 and 66 extend along a pivot axis 68. In such embodiment, channels 20 and 38, and channels 30 and 48, are radially in alignment relative to pivot axis 68 as depicted in FIGS. 2 and 3; that is, the radial distance between axis 24 and 68 is equal to the radial distance between axis 42 and 68 so that the splice members 12 and 14 may be pivoted about axis 68, in the circumferential direction 70 relative to axis 68, into and out of engagement with each other in a closed mode and an open mode, respectively.

At least one channel 30, 48 will comprise one or more protuberances, and in the preferred embodiment each channel 30, 48 will comprise at least one protuberance. For example, in the embodiment of FIGS. 1 to 3 channel 30 comprises four rows 72 of protuberances 74. Each row 72 extends in a circumferential direction 76 relative to axis 24 and comprises a plurality of protuberances 74 which are equally spaced in circumferential direction 76. For example, in the embodiment depicted in FIGS. 1 and 2, each row 72 includes two protuberances 74. Each protuberance 74 extends radially from surface 54 towards axis 24. In a like manner, channel 48 comprises four rows 78 of protuberances 80. Each row 78 extends in a circumferential direction 82 relative to axis 42 and comprises a plurality of protuberances 80 which are equally spaced in circumferential direction 82. For example, in the embodiment depicted in FIGS. 1 and 2, each row 78 includes two protuberances 80. Each protuberance 80 extends radially from surface 58 towards axis 42. In the embodiment of FIGS. 1 and 2, axes 24, 42 and 68 are parallel, and axis 24 and 42 are coincident when in a closed mode to form a longitudinal axis of the splice 10.

In the preferred embodiment, splice member 12 may be coupled to splice member 14 by one or more couplers. For example, splice member 12 may comprise at least one coupler and splice member 14 may comprise at least one mating coupler. In the embodiment of FIGS. 1 to 3, splice member 12 includes two couplers in the form of protuberances 84 and splice member 14 includes two mating couplers in the form of recesses 86. Similarly, splice member 14 includes two couplers in the form of protuberances 88 and splice member 12 includes two mating couplers in the form of recesses 90. By dimensioning the protuberances and recesses to provide respective snap fits therebetween, when splice member 12 and splice member 14 are pivoted about axis 68 to a closed position as depicted in phantom lines in FIGS. 2 and 3, protuberances 84 will mate with recesses 86 and protuberances 88 will mate with recesses 90 to lock or otherwise couple splice member 12 to splice member 14.

FIG. 4 depicts the splice 10 of FIGS. 1 to 3 in use as part of a connector. In particular, the splice 10, designated schematically in phantom lines in FIG. 4, is used to facilitate the electrical and mechanical connection of a conductor 100 to a conductor 102. In the embodiment of FIG. 4, conductor 100 comprises a coaxial cable 104 which includes a segment in the form of a length of insulative covering 106 free of ground wires and an end which comprises a length of monofilament wire 108 extending from the length of insulative covering 106. The second conductor 102 comprises an insulated multifilament wire which includes a segment in the form of a length of insulative covering 110 and an end which comprises a length of multifilament wire 112 extending from the length of insulative covering 110. The monofilament wire 108 and the multifilament wire 112 extend into respective opposite ends of a metal sleeve 114 which may be crimped to form a coupler which mechanically and electrically couples the two wires together. In the embodiment of FIG. 4, a metal sleeve 115 is attached to an outer peripheral surface 116 of the coaxial cable 104 adjacent the length of insulative covering 106, and a ground wire portion 118 formed by a length of ground wires of the coaxial cable 104 is folded back upon the metal sleeve 115 in a conventional manner.

After the monofilament wire 108 and multifilament wire 112 have been coupled together by sleeve 114 such wires are enclosed in a splice 10. To this end, the length of insulative covering 106 may be inserted into channel 20 and a segment of the length of insulative covering 110 may be inserted into channels 20 and 30, as depicted in FIG. 5. The splice members 12 and 14 are then pivoted relative to each other to a closed mode as depicted in phantom lines in FIGS. 2 and 3 causing the surfaces 52, 56, and the protuberances 74, 80, to bear against the length of insulative covering 106 and the segment of the length of insulative covering 110, respectively, to hold the conductors 100, 102, respectively, in place within respective cavities 60, 62 of the splice 10. In the closed mode, the conductor ends formed by the end of monofilament wire 108 and the end of multifilament wires 112, and the metal sleeve 114, will be located in the cavity 60 formed by channels 20 and 38. The length of insulative covering 106 is bound or held in place by walls 52 and 56 by dimensioning the channel cavity 60 such that walls 52 and 56 bear against length 106 when the splice 10 is pivoted about axis 68 into a closed mode. The length of insulative covering 110 is bound or held in place within the splice 10 by dimensioning the channel cavity 62 and the protuberances 74 such that the protuberances bear against the length of insulative covering 110 when splice 10 is pivoted about axis 68 into a closed mode. In the preferred embodiment, the portion 120 of the coaxial cable 104 from which the length of insulative covering 106 extends will bear against the ends 26 and 44 of respective splice members 12 and 14. If desired, one or more protuberances may be provided which extend into channels 20 and 38 towards respective axes 24 and 42 for the purpose of bearing against the peripheral surface 116 of the coaxial cable 104 when the splice 10 is in a closed mode. For example, with reference to FIGS. 1 and 5, a protuberance 122 is provided adjacent end 26 and a protuberance 124 is provided adjacent end 44. Protuberance 122 extends in circumferential direction 76 and protrudes towards axis 24, and protuberance 124 extends in circumferential direction 82 and protrudes towards axis 42.

The connector of FIG. 4 may also be provided with a clamp for the purpose of attaching the connector to a support surface, if desired. For example, a metal sleeve 126 is provided into which the splice 10 is inserted. In this embodiment, the ground wire portion 118 is sandwiched between the inner surface 128 of sleeve 126 and the outer surface 130 of the sleeve 114. A clamp 132 is provided which comprises a first portion 136 having an open-ended cylindrical length into which the metal sleeve 126 may be snugly fit and a second portion 138 which is attachable to a support surface 140 in a conventional manner.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A splice, comprising a first splice member and a second splice member each comprising a first surface, an opposite second surface, a first channel extending into said first surface towards said opposite second surface, said first channel further extending in the direction of a horizontal axis of a respective splice member from a first end of said first surface towards an opposite second end of said first surface, and a second channel extending into said first surface towards said second surface, said second channel further extending in the direction of said horizontal axis from said opposite second end of said first surface towards said first end of said first surface, said second channel opening into said first channel, said first splice member being pivotally connected to said second splice member along a pivot axis, said first channel and said second channel of said first splice member being radially in alignment relative to said pivot axis with said first channel and said second channel, respectively, of said second splice member, said first splice member and said second splice member being pivotal into and out of engagement with each other in a closed mode and an open mode, respectively, at least one second channel including a channel surface which comprises one or more protuberances.

2. The splice of claim 1 wherein each second channel comprises at least one protuberance.

3. The splice of claim 2 wherein said at least one protuberance comprises a plurality of rows of protuberances, each row of said plurality of rows extending in a circumferential direction relative to a respective horizontal axis of said first splice member and said second splice member, said horizontal axis being parallel to said pivot axis, and coincident with a longitudinal axis of said splice in said closed mode.

4. The splice of claim 3 wherein each row of said plurality of rows comprises a plurality of protuberances which are equally spaced in said circumferential direction.

5. The splice of claim 1 wherein said first splice member comprises at least one coupler and said second splice member comprises at least one mating coupler.

6. The splice of claim 1 wherein said first splice member comprises at least one first protrusion and at least one first recess, and further wherein said second splice member comprises at least one second protrusion and at least one second recess, said at least one first protrusion and said at least one first recess mating with said at least one second recess and said at least one second protrusion, respectively, in said closed mode.

7. A connector, comprising:

a splice comprising a first splice member and a second splice member each comprising a first surface, an opposite second surface, a first channel extending into said first surface towards said opposite second surface, said first channel further extending in the direction of a longitudinal axis of said splice from a first end of said first surface towards an opposite second end of said first surface, and a second channel extending into said first surface towards said second surface, said second channel further extending in the direction of said longitudinal axis of said splice from said opposite second end of said first surface towards said first end of said first surface, said second channel opening into said first channel, said first splice member being connected to said second splice such that said first channel and said second channel of said first splice member are in alignment with said first channel and said second channel, respectively, of said second splice member, to form a respective first cavity and second cavity, formed by walls of each said first channel and each said second channel, respectively;

a first conductor having a segment which extends into said first cavity and a first conductor end which is positioned in said first cavity;

a second conductor having a segment, which extends through said second cavity and into said first cavity and is bound by said walls of said second channel, and a second conductor end which is positioned in said first cavity adjacent said first conductor end, said first conductor comprising a coaxial cable and said segment of said first conductor comprising a length of insulative covering of said coaxial cable free of ground wire and said first conductor end is a length of monofilament wire of said coaxial cable extending from said length of insulative covering of said coaxial cable, and further wherein said second conductor comprises an insulated multifilament wire and said segment of said second conductor comprises a length of insulative covering of said insulated multifilament wire and said second conductor end is a length of multifilament wire of said insulative multifilament wire extending from said length of said insulative covering of said insulated multifilament wire, said coupler coupling said monofilament wire to said multifilament wire; and a coupler which couples said first conductor end to said second conductor end.

8. The connector of claim 7 wherein said coupler comprises a sleeve into opposite ends of which said length of monofilament wire and said length of multifilament wire extend.

9. The connector of claim 8 wherein said sleeve is crimped against said length of monofilament wire and said length of multifilament wire.

10. The connector of claim 7 wherein each second channel comprises at least one protuberance.

11. The connector of claim 10 wherein said at least one protuberance comprises a plurality of rows of protuberances, each row of said plurality of rows extending in a circumferential direction relative to a respective horizontal axis of said first splice member and said second splice member, each horizontal axis being coincident with a longitudinal axis of said splice in said closed mode.

12. The connector of claim 11 wherein each row of said plurality of rows comprises a plurality of protuberances which are equally spaced in said circumferential direction.

13. The connector of claim 7 wherein said first splice member comprises at least one coupler and said second splice member comprises at least one mating coupler.

14. The connector of claim 7 wherein said first conductor is bound by said walls of said first channel.

15. The connector of claim 10 including a first metal sleeve attached to an outer peripheral surface of said coaxial cable adjacent said length of insulative covering of said coaxial cable, a ground wire portion of said coaxial cable being folded back upon said first metal sleeve, and further including a second metal sleeve having an inner surface adjacent said splice and having a sleeve end adjacent said ground wire portion.

16. The connector of claim 15 further including a clamp, said clamp comprising a first portion coupled to said second metal sleeve and a second portion attachable to a support surface.

17. The connector of claim 7 wherein said first splice member is pivotally connected to said second splice member along a pivot axis, said first channel and said second channel of said first splice member being radially in alignment relative to said pivot axis with said first channel and said second channel, respectively, of said second splice member.

* * * * *